May 16, 1967
G. C. PICKARD ETAL
3,319,609
ANIMAL RESTRAINER
Filed Oct. 21, 1965
2 Sheets-Sheet 1
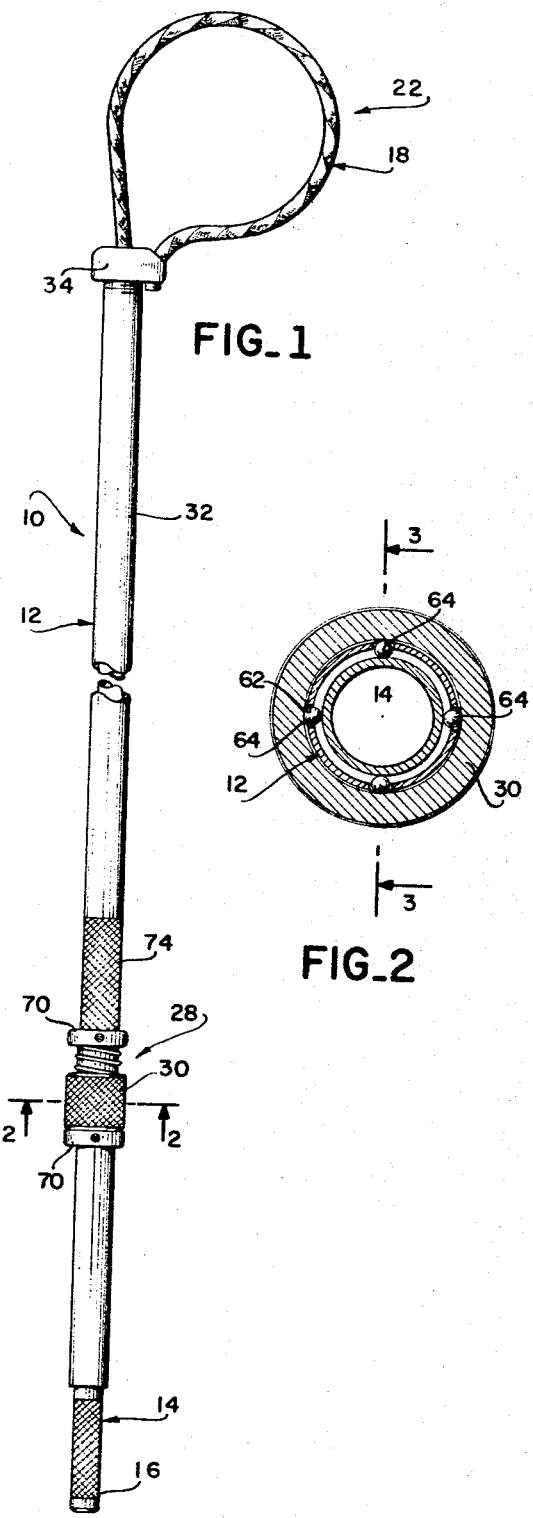
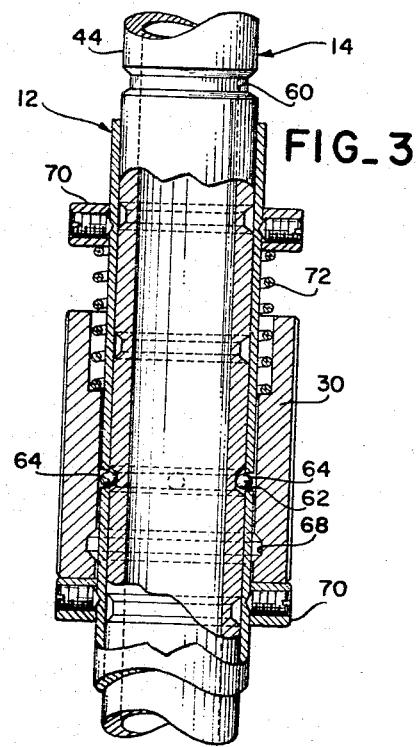
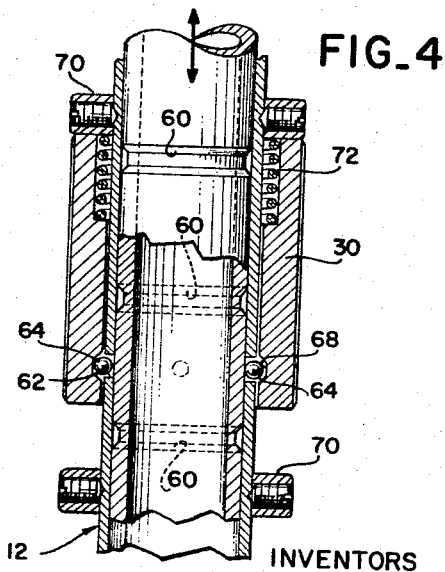
INVENTORS
GEORGE C. PICKARD
ADOLPH C. GLASS
SAMUEL HODESSON
BY R. E. Geauque
Attorney May 16, 1967
G. C. PICKARD ETAL
3,319,609
ANIMAL RESTRAINER
Filed Oct. 21, 1965
2 Sheets-Sheet 2
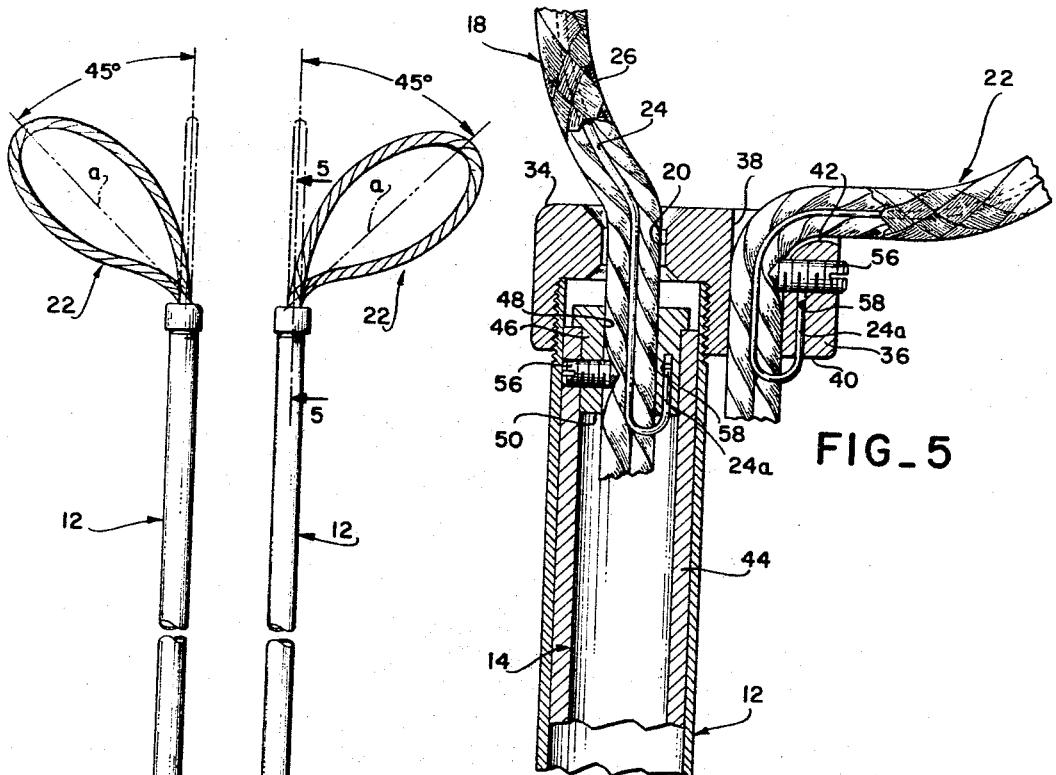
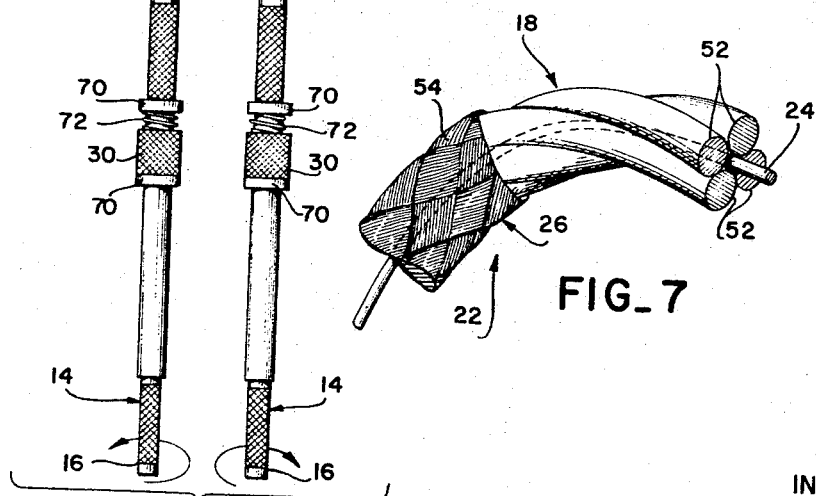
INVENTORS
GEORGE C. PICKARD
ADOLPH C. GLASS
SAMUEL HODESSON
BY *R. E. Georges*
Attorney ered by this invention may be readily realized, are shown by way of preferred embodiments in the accompanying drawings, in which:

United States Patent Office
3,319,609
Patented May 16, 1967

3,319,609
ANIMAL RESTRAINER
George C. Pickard, 17610 Hamlin, Van Nuys, Calif. 91406, Adolph C. Glass, 20146 Hart St., Canoga Park, Calif. 91306, and Samuel Hodesson, 2139 Casa Grande Drive, West Covina, Calif. 91790
Filed Oct. 21, 1965, Ser. No. 499,206
10 Claims. (Cl. 119—153)

This invention relates generally to an animal restrainer and has more particular reference to improvements in animal snares of the kind which are characterized by an elongate pole-like handle having at one end a noose operable from the other end of the handle.

The prior art is replete with a wide assortment of animal snares of the general class to which this invention pertains. The existing snares of this type, however, are deficient in certain respects. It is these deficiencies which the present invention seeks to overcome.

Many of the prior art snares utilize a semirigid noose constructed of wire, cable, or other relatively stiff though flexible material. Such a semirigid noose is superior for two reasons to a non-rigid noose composed of rope or the like. First, a semirigid noose normally assumes an open-loop configuration which facilitates placement of the noose over an animal. Secondly, the noose may be disposed in various attitudes by rotation of the snare handle, thereby to permit disposition of the noose in the optimum attitude for placement over an animal. The existing snares of this type, however, are defective for the reason that the attitude of the noose relative to the snare handle is fixed; that is to say, the noose is always disposed in a plane generally parallel to the axis of the handle. Accordingly, if it is necessary to shift the noose in a direction transverse to its plane in order to locate the noose in the proper position for placement over an animal, the entire snare structure must be laterally moved. More important, however, is the fact that it is impossible to locate the noose in a plane transverse to the longitudinal axis of the snare handle in order to permit engagement of the noose over an animal by axial movement of the snare handle. As a consequence, it is often difficult or impossible to snare an animal, particularly on animal located in a confined space.

Most of the existing snares of the kind under discussion are equipped with means for releasably securing or locking the noose in its constricted condition about an animal. Some of the locking means employed for this purpose act positively only to prevent enlargement of the noose. Accordingly, after an animal is snared, it is possible that the noose may be accidentally constricted to such an extent as to choke the animal. Those existing noose locking means which act positively to prevent constriction as well as enlargement of the noose tend to be difficult to operate in concert with constriction of the noose; that is to say, the existing snares equipped with locking means of this latttr type often require two distinct actions on the part of the snare operator, to wit, one action to release the locking means and a second distinct action to constrict the noose. Accordingly, such snares are difficult and time-consuming to operate and thus render difficult the task of snaring an animal, particularly an animal in motion. Moreover, the locking means employed on many existing snares are quite primitive in construction and embody projecting parts which interfere with the operation of the snare.

It is a general object of this invention to provide an animal snare of the character described which avoids the foregoing and other deficiencies of the prior art snares of this kind.

A more specific object of the invention is to provide an improved animal snare of the character described wherein the noose may be angularly adjusted relative to the snare handle to selectively position the noose in planes parallel to and transverse to the longitudinal axis of the handle. According to this aspect of the invention, the noose comprises a relatively stiff though flexible band or wire which is firmly attached at its ends to the outer end of the snare handle and the outer end of an axially and rotatably movable snare operating shaft extending lengthwise of the handle in such a way that relative axial movement of the handle and shaft is effective to constrict and enlarge the noose. Relative rotation of the handle and shaft is effective to laterally rotate or swing the noose relative to the handle between a central position wherein the noose is disposed in a plane generally parallel to the longitudinal axis of the handle and positions at either side of the central position wherein the noose is disposed in planes transverse to the axis. In these latter positions, the noose faces in a generally axial direction of the handle and, therefore, may be engaged over an animal by axial movement of the handle toward the animal.

Another object of the invention is to provide an improved animal snare of the character described which is equipped with novel locking means for positively locking the snare handle and operating shaft against relative movement to both constrict and enlarge the noose, and wherein the locking means are uniquely constructed to permit simultaneous release thereof and constriction of the noose with a single natural arm movement. According to this aspect of the invention, the locking means comprise a lock actuating member which is movable forwardly or outwardly on the snare handle to release the latter and the operating shaft for relative movement and inwardly on the handle to lock the latter and operating shaft against relative movement. The rear or inner end of the operating shaft is exposed to form a hand grip. Accordingly, simultaneous release of the locking means and constriction of the noose is accomplished by simply grasping with one hand the lock actuating member and with the other hand the hand grip of the operating shaft and then simultaneously pushing forward on the member and pulling rearwardly on the operating shaft.

A further object of the invention is to provide an improved animal snare of the character described wherein the noose is angularly adjustable relative to the snare handle by relative rotation of the handle and the snare operating shaft, and wherein further the locking means for releaseably locking the handle and shaft against relative axial movement to enlarge and constrict the noose is operable in all relative angular positions of the handle and shaft and hence in all relative angular positions of the handle and noose. According to this aspect of the invention, the locking means for the handle and operating shaft comprises a radially movable detent on the handle which is engageable in axially spaced, circumferential grooves in the shaft, in every relative angular position of the handle and shaft. The lock actuating member comprises a sleeve which is movable rearwardly on the handle to retain the detent in the aligned shaft groove and forwardly on the handle to release the detent for radial movement from the groove.

A still further object of the invention is to provide an animal snare of the character described which is relatively simple in construction, economical to manufacture, reliable in operation, easy to use, and otherwise ideally suited to its intended purposes.

Other objects, advantages, and features of the invention will become readily evident as the description proceeds.

With these and other objects in view, the invention consists in the construction, arrangement, and combination of the various parts of the snare, whereby the objects contemplated are attained, as hereinafter set forth, pointed out in the appended claims, and illustrated in the accompanying drawings.

In these drawings:

FIGURE 1 is a side elevation of an improved animal snare according to the invention;

FIGURE 2 is an enlarged section taken on line 2—2 in FIGURE 1;

FIGURE 3 is a section taken on line 3—3 in FIGURE 2 illustrating the improved locking means of the snare in its locked condition;

FIGURE 4 is a view similar to FIGURE 3 illustrating the locking means in its unlocked condition;

FIGURE 5 is an enlarged fragmentary section taken axially through the outer end of the snare, illustrating the manner in which the ends of the snare cord are attached to the handle and operating shaft of the snare;

FIGURE 7 is an enlarged fragmentary view illustrating the construction of the snare cord; and FIGURE 6 are side elevations of the snare, on reduced scale illustrating the manner in which the noose is angularly adjustable relative to the snare handle.

The snare 10 illustrated in these drawings comprises an enlongated pole-like handle 12 mounting an axially and rotatably movable snare operating shaft 14. The inner or rear end of this shaft is exposed at the inner or rear end of the handle 12 to form a hand grip 16. At the forward or outer end of the handle 12 is a flexible snare cord 18 which is firmly attached at its ends to the outer ends of the handle 12 and operating shaft 14, respectively, and extends through an axial opening 20 in the outer end of the handle to form a noose 22. Snare cord 18 comprises an inner, relatively stiff though flexible reinforcing member or wire 24 and an outer resilient sheath 26 which encases the member. The relatively stiff inner member 24 normally retains the noose 22 in its illustrated open loop configuration and the member 24 is preferably formed from tempered steel spring wire, such as piano wire which is high carbon steel drawn to spring temper. The diameter of the wire 24 and sheath 26 can vary in accordance with the size and nature of the animals for which the snare is to be used. The most generally useful wire diameters will be in the range of .015 to .125 inch but this range is not limiting. The sheath is preferably formed of braided nylon to protect the animals and can also vary in size. In one form of the snare, a 1/16" diameter wire is covered by a 3/8" braided nylon rope.

Coacting between the handle 12 and the operating shaft 14 is a locking means 28 for locking the handle and shaft against relative axial movement. As will appear presently, this locking means is operable in all relative angular positions of the handle and shaft. Locking means 28 includes a lock-actuating member 30 which is movable length of the handle 12 to engage and release the locking means. Inward movement of this actuating member to its locking position of FIGURE 3 engages the locking means 28 to restrain the handle and operating shaft against relative axial movement. Outward movement of the actuating member 30 to its unlocking position of FIGURE 4 releases the locking means to permit relative axial movement of the handle and operating shaft.

At this point, it is evident that relative axial movement of the handle 12 and operating shaft 14 is effective to enlarge and constrict the noose 22. As will appear presently, relative rotation of the handle and shaft is effective to angularly adjust the noose relative to the handle between the phantom and full line positions of the noose illustrated in FIGURE 6. In its phantom line position of FIGURE 6, the noose is disposed in a plane generally parallel to the longitudinal axis of the handle. In its full line positions, the noose is disposed in planes transverse to the handle axis.

Referring now in greater detail to the illustrated animal snare 10, the snare handle 12 comprises a sleeve or tube 32, the outer end of which is externally threaded to receive a cap 34. The snare cord opening 20 comprises a bore extending through the cap on the axis of the handle tube 32. The outer end of this bore is preferably flared, as shown. Cap 34 has a laterally projecting portion 36 which extends to one side of the handle tube 32. Extending through this projecting portion of the cap, parallel to the snare cord opening 20, is a second snare cord opening or bore 38. The inner end of the snare cord opening 38 opens through an inwardly presented face 40 on the projecting cap portion 36. The outer end of the snare cord opening 38 opens axially through the outer face of the projecting cap portion 36 and laterally of the cap portion, in a direction away from the snare cord opening 20, through a slot 42 in the cap. Preferably, the inner wall of the cap slot 42 is rounded, as shown.

The snare operating shaft 14 comprises a sleeve or tube 44 which is slidably positioned within the handle tube 32. The outer end of this shaft tube is located within the outer end of the handle 12, adjacent the cap 34, and has fixed therein a plug 46. Extending axially through this plug is a snare cord opening or bore 48 which opens, at its inner end, through the inwardly presented end face 50 of the plug.

The outer resilient sheath 26 of the snare cord 18 may be constructed of various materials. The sheath of the illustrated snare cord is composed of a number of fiber strands or chords 52 which are helically twisted about the central reinforcing member 24 of the snare cord and an outer woven layer 54 about the fiber strands. Similarly, the inner reinforcing member 24 of the snare chord may be made from various relative stiff though flexible materials. Preferably, however, this member comprises a strand or length of piano wire, or the like.

One end of the snare chord 18, extends through the slot 42 and is positioned in the snare cord opening 38 in the handle cap 34. The other end of the snare cord extends through the snare cord opening 20 in the cap and is positioned in the snare cord opening 48 in the operating shaft plug 46. The snare cord openings 38 and 48 are dimensioned to receive the outer sheath 26 of the snare cord with a relatively snug fit. The snare cord opening 20 in the handle cap 34 is dimensioned to loosely receive the snare cord sheath, thereby to permit the snare cord to move freely through the latter opening.

The ends of the snare cord 18 are secured to the outer end of the handle 12 and the outer end of the operating shaft 14 by two separate attachment means. One of these attachment means comprise set screws 56 which are threaded in the handle cap 34 and the shaft plug 46, respectively, and engage the adjacent ends of the snare cord sheath 26, as shown, to restrain these ends against pulling out from their respective snare cord openings. The other snare cord attachment means is furnished by the ends of the snare cord reinforcing member or wire 24. These ends of the wire have reverse bends terminating in outwardly directed extremities 24a which are disposed externally of the snare cord sheath 26. The wire extremities 24a engage in bores 58 opening through the inwardly presented faces 40 and 50 of the handle cap 34 and shaft plug 46, respectively, in laterally offset relation to the snare cord openings 38 and 48. It is evident that engatement of the wire extremities 24a and the bores 58 is effective to positively secure the ends of the snare cord reinforcing member 24 against rotation relative to the handle 12 and shaft 14.

It is now evident that the snare cord 18 is firmly attached to the outer ends of the handle 12 and operating shaft 14 in such a way that relative axial movement of the handle and shaft in one direction enlarges the noose 22. Relatively axial movement of the handle and shaft in the opposite direction constricts the noose. It is further evident that relative rotation of the handle and operating shaft creates a torsional twist or strain in the snare cord 18, and particularly in its reinforcing member of wire 24. This torsional twisting of the reinforcing member creates stresses in the member which cause angular displacement of the noose 22 relative to the handle 12 in a direction transverse to the longitudinal axis of the handle and to the plane of the noose. The direction of this angular displacement is determined by the direction of relative rotation of the handle and operating shaft. Thus, rotation of the operating shaft 14 relative to the handle 12 in the direction indicated by the right-hand arrow in FIGURE 6 effects angular displacement of the noose 22 to the right in the latter figure to its solid line position shown, wherein the noose is disposed in a plane transverse to the handle axis. In this position of the noose, the angle between the longitudinal axis of the handle and the noose axis a may approach 45 or more. Similarly, relative rotation of the operating shaft in the direction of the left-hand arrow in FIGURE 6 effects left-hand angular displacement of the noose by a substantially equal amount.

Thus, the noose 22 may be positioned in a plane generally parallel to the longitudinal axis of the handle 12, as shown in phantom outline in FIGURE 6, and in various planes transverse to the handle axis, by relative rotation of the handle and operating shaft 14. When the noose is disposed in a transverse plane of the handle, one open side of the noose faces in a generally axial direction of the handle. Accordingly, the noose may be engaged about an animal by axially advancing the snare handle 12 toward the animal. As noted earlier, the existing animal snares of this general type cannot be used in this way since the noose of such snares is always disposed in a plane parallel to the handle axis. Moreover, the noose of the present snare can be laterally positioned without moving the snare handle 12. As a consequence of these features, the present snare is uniquely suited for use in confined spaces, and for other applications to which the existing snares are ill-suited because of their fixed attitude of the noose relative to the snare handle.

The locking means 28 for releasably locking the handle 12 and operating shaft 14 against axial movement, and thereby securing the noose 22 in a given constricted size, comprises, in addition to the lock-actuating member 30, a number of axially spaced, circumferentially extending grooves 60 in the operating shaft. Positioned in radial openings 62 in the wall of the handle tube 32 are ball detents 64 for engaging in the shaft grooves 60. Actually, one detent would suffice. Preferably, however, a number of detents, uniformly spaced about the handle, are employed, are illustrated in the drawings. These detents are located in a common plane normal to the axis of the handle 12 and are radially movable between their locking positions of FIGURE 3, wherein the detents engage in the aligned groove 60 in the operating shaft 64 to lock the shaft and handle against relative axial movement, and their unlocking positions in FIGURE 4, wherein the detents are disengaged from the shaft grooves 60 to release the operating shaft and handle for relative axial movement. The lock actuating member 30 comprises a sleeve slidable on the handle 12. Within this sleeve is a circumferential groove 68. When the lock actuator 28 occupies its rear or locking position of FIGURE 3, the actuating sleeve groove 68 is laterally offset from the ball detents 64 and the internal sleeve surface engages the detents to retain the latter in their locking positions shown. When the actuator 28 occupies its unlocking position of FIGURE 4, the actuator sleeve groove 68 is aligned with the ball detents 64 to permit radial outward movement of these detents to their unlocking positions shown, wherein the handle and operating shaft are released for relative axial movement.

Fixed to the handle 14, at opposite sides of the lock actuator 30, are collar stops 70 for limiting axial movement of the actuator to its locking and unlocking positions. A spring 72 acting between the outer collar and the actuator urges the latter to its locking position of FIGURE 3.

The rear hand grip 16 of the operating shaft 14 and the lock actuating sleeve 30 are preferably knurled, as shown, to facilitate grasping of the same. The handle 12 is knurled just forwardly of the forward stop collar 70 to form a hand grip 74 on the handle.

According to the preferred manner of using the present improved animal snare 10, the latter is held by grasping, with one hand, the rear hand grip 16 on the snare operating shaft 14 and grasping, with the other hand, the lock actuating sleeve 30. The noose 22 is enlarged, to place the snare in readiness for engagement over an animal, by moving the lock actuating sleeve to its forward or outer unlocking position of FIGURE 4 and sliding the operating shaft forward or outwardly in the snare handle 12. The nose 22 may be located in the optimum position for engagement over the animal to be snared by rotating or laterally moving the entire snare structure and/or relatively rotating the handle and operating shaft to laterally angularly position the noose relative to the handle. When the animal is snared, the noose is constricted by releasing the locking means 28 and retracting the operating shaft 14 rearwardly relative to the handle 12. A unique feature of the invention resides in the fact that this constriction of the noose may be quickly and easily effected with a single natural body movement by simultaneously pulling rearwardly or inwardly; on the snare operating shaft 14 and pushing forwardly or outwardly on the lock actuating sleeve 30. This single motion simultaneously releases the locking means 28 and constricts the noose 22.

It is now evident, therefore, that the invention herein described and illustrated is fully capable of attaining the several objects and advantages preliminarily set forth.

While one specific embodiment of the invention has been disclosed for the purpose of illustrating the invention, it is to be understood that the invention is not limited to this embodiment and that various modifications in the design, arrangement of parts, and instrumentalities of the invention are possible within the spirit and scope of the following claims.

What is claimed is:

1. A snare comprising:
    an elongate pole-like handle having inner and outer ends;
    a longitudinally and rotatably movable snare operating shaft extending lengthwise of and supported by said handle;
    said shaft having an exposed hand grip at its inner end;
    said handle having a longitudinal opening at its outer end generally longitudinally aligned with the outer end of the shaft;
    a snare cord comprising a relatively stiff though flexible tempered spring wire secured at its ends to said outer ends, respectively, of said handle and shaft and extending through said handle opening to form an open loop-shaped noose;
    said handle and shaft being relatively longitudinally movable to radially enlarge and constrict said noose and said handle and shaft being relatively rotatable in either direction to angularly move said noose relative to said handle along a direction line transverse to said handle and to the plane of said noose; and
    locking means coacting between said handle and shaft and operable in all relative angular positions thereof for releasably locking said handle and shaft against relative longitudinal movement in various relative longitudinal positions thereof.

2. A snare according to claim 1 wherein:
    said snare cord further comprises a resilient sheath encasing said spring wire and capable of being twisted without unwinding by said relative rotation of said handle and shaft.

3. A snare according to claim 1 wherein:
the outer ends of said handle and shaft have longitudinal openings receiving the ends of said snare cord, inwardly presented faces adjacent the inner ends of said openings, and bore openings through said faces in laterally offset relation to said openings; and
the ends of said spring wire have reverse bands defining outwardly extending extremities engaging in said bores to positively secure the ends of said wire against rotation relative to the outer ends of said handle and shaft.

4. A snare according to claim 1 wherein:
said locking means includes a lock actuator on the inner end of said handle which is axially movable toward the outer end of said handle to release said locking means and toward the inner end of said handle to engage said locking means.

5. A snare comprising:
an elongate tubular handle having inner and outer ends;
a longitudinally and rotatably movable snare operating shaft extending through said handle;
the outer end of said shaft being located within the outer end of said handle and the inner end of said shaft extending beyond the inner end of said handle to form a hand grip;
the outer end of said handle having an axial opening;
a flexible snare cord comprising a relatively stiff though flexible single strand tempered spring wire;
means securing one end of said spring wire to the outer end of said handle;
the other end of said spring wire extending through said handle opening;
means securing said other end of said spring wire to the outer end of said shaft, whereby said cord defines a noose;
said handle and shaft being relatively axially movable to radially enlarge and constrict said noose and said handle and shaft being relatively rotatable in either direction to angularly move said noose relative to said handle in a direction transverse to said handle and to the plane of said noose; and
locking means coacting between said handle and shaft and operable in all relative angular positions thereof for releasably locking said handle and shaft against relative axial movement in various relative axial positions thereof.

6. A snare comprising:
an elongate tubular handle having inner and outer ends;
a cap fixed to the outer end of said handle including a projecting portion extending laterally beyond one side of said handle and having an inner inwardly presented face and an outer outwardly presented face;
said cap having a first opening on the longitudinal axis of and opening to the interior of said handle, a second opening in and extending through said inner and outer faces of said projecting cap portion generally parallel to said first opening, and a bore opening through said inner face in laterally offset relation to said second opening;
a tubular snare operating shaft slidable in said handle;
said shaft having an outer end located within the outer end of said handle adjacent said cap and an inner end extending beyond the inner end of said handle to form a hand grip;
a plug fixed in the outer end of said shaft having an axial opening therethrough, an inwardly presented face surrounding the inner end of said plug face in laterally offset relation to said plug opening;
a flexible snare cord extending through said first cap opening and having its ends fixed in said second cap opening and said plug opening, respectively, to form a noose;
said cord comprising an inner relatively stiff though flexible reinforcing member and an outer resilient sheath encasing said reinforcing member;
the ends of said reinforcing member having reverse bends defining outwardly extending extremities disposed externally of said sheath, and said extremities engaging in said bores, respectively, to positively secure the ends of said reinforcing member against rotation relative to said handle and operating shaft, respectively;
said handle and shaft being relatively axially movable to radially enlarge and constrict said noose and said handle and shaft being relatively rotatable to angularly move said noose relative to said handle in directions transverse to said handle and to the plane of said noose; and
locking means coacting between said handle and shaft and operable in all relative angular positions thereof for releasably locking said handle and shaft against relative axial movement in various relative axial positions thereof.

7. A snare according to claim 6 wherein:
said locking means comprises a series of axially spaced circumferential grooves in said shaft, a locking detent disposed in an opening in the wall of said handle for selective engagement in said shaft grooves, and a lock actuating sleeve slidable inwardly on said handle to a locking position wherein said sleeve engages said detent to retain the latter in the aligned shaft groove and slidable outwardly on said handle to an unlocking position wherein an internal groove in said sleeve is aligned with said detent to release the latter for outward radial movement from the aligned shaft groove, thereby to release said handle and operating shaft for relative axial movement.

8. A snare comprising:
an elongate tubular handle having outer and inner ends;
a longitudinally and rotatably movable snare operating shaft extending through said handle;
the outer end of said shaft being located within the outer end of said handle and the inner end of said shaft being exposed to form a hand grip;
the outer end of said handle having an axial opening;
a flexible snare cord secured at its ends to the outer ends of said handle and shaft, respectively, and extending through said handle opening to form a noose;
said handle and shaft being relatively axially movable to enlarge and constrict said noose and said handle and shaft being relatively rotatable to angularly position said noose;
said shaft having a number of axially spaced circumferential grooves;
a detent disposed within an opening in the wall of said handle for selective locking engagement in said shaft grooves;
a lock actuating sleeve slidable on said handle and having an internal circumferential groove;
said sleeve being movable relative to said handle to a locking position wherein said sleeve engages said detent to retain the latter in locking engagement with the aligned shaft groove, thereby to lock said handle and shaft against relative axial movement, and said sleeve being movable relative to said handle to an unlocking position wherein said internal sleeve groove is aligned with said detent to release said detent for disengagement from the aligned shaft groove, thereby to release said handle and shaft for relative axial movement.

9. A snare according to claim 8 including:
stop collars fixed to said handle at opposite ends of said actuating sleeve limiting axial movement of said sleeve relative to said handle; and
a spring acting between the outer stop collar and said sleeve for urging the latter to said locking position thereof.

10. A snare comprising:

an elongate tubular handle having inner and outer ends;

a cap fixed to the outer end of said handle including a projecting portion extending laterally beyond said outer end of said handle and having an inner inwardly presented face and an outer outwardly presented face;

said cap having a first opening on the axis of an opening to the interior of said handle, a second opening in and extending through said inner and outer faces of said projecting cap portion generally parallel to said first opening, and a bore extending through said inner face in laterally offset relation to said second opening;

a tubular snare operating shaft slidable in said handle; said shaft having an outer end located within the outer end of said handle adjacent said cap and an inner end extending beyond the inner end of said handle to form a hand grip;

a plug fixed in the outer end of said shaft having an axial opening, an inwardly presented face surrounding the inner end of said plug opening, and a bore opening through said plug face in laterally offset relation to said plug opening;

a flexible snare cord extending through said first cap opening and having its ends fixed in said second cap opening and said plug opening, respectively, to form a noose;

said cord comprising an inner relatively stiff though flexible reinforcing member and an outer resilient sheath encasing said reinforcing member;

the ends of said reinforcing member having reverse bends defining outwardly extending extremities disposed externally of said sheath, and said extremities engaging in said bores, respectively, to positively secure the ends of said reinforcing member against rotation relative to said handle and shaft, respectively;

said handle and shaft being relatively axially movable to radially enlarge and to constrict said noose, and said handle and shaft being relatively rotatable to angularly move said noose relative to said handle in directions transverse to said handle and to the plane of said noose;

said shaft having a number of axially spaced circumferential grooves;

a detent disposed within an opening in the wall of said handle for selective engagement in said shaft grooves;

an actuating sleeve slidable on said handle having an internal groove;

said sleeve being movable inwardly relative to said handle to a locking position wherein said sleeve engages said detent to retain the latter in locking engagement with the aligned shaft groove, thereby to lock said shaft and handle against relative axial movement, and said sleeve being movable outwardly relative to said handle to an unlocking position wherein said internal sleeve groove is aligned with said detent to release said detent for disengagement from the aligned shaft groove, thereby to release said shaft and handle for relative axial movement;

stop collars fixed to said handle at opposite ends of said sleeve for limiting axial movement thereof; and a spring acting between the outer stop collar and said sleeve for urging said sleeve to said locking position thereof.

References Cited by the Examiner
UNITED STATES PATENTS

| | | | |
|---|---|---|---|
| 892,540 | 7/1908 | McComb | 119—153 |
| 2,499,511 | 3/1950 | Koger | 119—153 |
| 2,704,052 | 3/1955 | Wood | 119—153 |
| 2,798,458 | 7/1957 | Odermatt | 119—106 |

ALDRICH F. MEDBERY, *Acting Primary Examiner.*

SAMUEL KOREN, HUGH R. CHAMBLEE, *Examiners.*